US006327815B1

United States Patent
Becton et al.

(10) Patent No.: US 6,327,815 B1
(45) Date of Patent: Dec. 11, 2001

(54) MODULAR LANDSCAPE APPARATUS AND METHOD THEREOF

(76) Inventors: Thomas Hayward Becton, 2894 Rose Hill, Tifton, GA (US) 31794; Billy Franklin Coffey, 6122 Pinewood Dr., Valdosta, GA (US) 31606

( * ) Notice: Subject to any disclaimer, the term of this patent is extended or adjusted under 35 U.S.C. 154(b) by 0 days.

(21) Appl. No.: 09/476,225

(22) Filed: Dec. 30, 1999

Related U.S. Application Data

(63) Continuation-in-part of application No. 09/069,336, filed on Apr. 28, 1998, now abandoned.

(51) Int. Cl.[7] .................................................. A01G 1/08
(52) U.S. Cl. .................................................. 47/33; 52/102
(58) Field of Search ................................ 47/33; 52/102; 404/6–8; A01G 1/08

(56) References Cited

U.S. PATENT DOCUMENTS

| | | | |
|---|---|---|---|
| 2,842,344 | * 7/1958 | Todd | 256/21 |
| 3,676,952 | * 7/1972 | Watts | 47/33 |
| 4,349,596 | * 9/1982 | Hendrix | 428/83 |
| 4,831,776 | * 5/1989 | Fritch | 47/33 |
| 4,905,409 | 3/1990 | Cole | 47/33 |
| 5,092,076 | * 3/1992 | Terreta | 47/33 |
| 5,212,917 | * 5/1993 | Kurtz et al. | 52/102 |
| 5,230,582 | * 7/1993 | Schmitt et al. | 404/6 |
| 5,259,154 | * 11/1993 | Lilley | 47/33 |
| 5,442,877 | 8/1995 | Lindhal | 47/33 |
| 5,675,930 | 10/1997 | Cooper | 47/33 |
| 5,857,288 | * 1/1999 | Wiste | 47/33 |
| 6,038,811 | * 3/2000 | Conway | 47/33 |
| 6,085,458 | * 7/2000 | Gau | 47/33 |

FOREIGN PATENT DOCUMENTS

| | | | |
|---|---|---|---|
| 2118243 | * 3/1971 | (DE) | 47/33 |
| 2336535 | * 7/1973 | (DE) | A01G/1/08 |
| 29721381 | * 12/1997 | (DE) | A01G/1/08 |

* cited by examiner

Primary Examiner—Peter M. Poon
Assistant Examiner—Son T. Nguyen
(74) Attorney, Agent, or Firm—Carnes Cona Dixon

(57) ABSTRACT

The present invention is a modular landscape apparatus including a plurality of brackets. The brackets are used with conventional landscaping timbers secured thereto. The brackets includes different embodiments to provide the user with a variety of options for forming any desired shaped border in a landscape design. The brackets include a pivotal mechanism which enables the option of transforming the bracket to any desired angle and for ultimately forming any desired boarder pattern.

14 Claims, 5 Drawing Sheets

Fig. 1

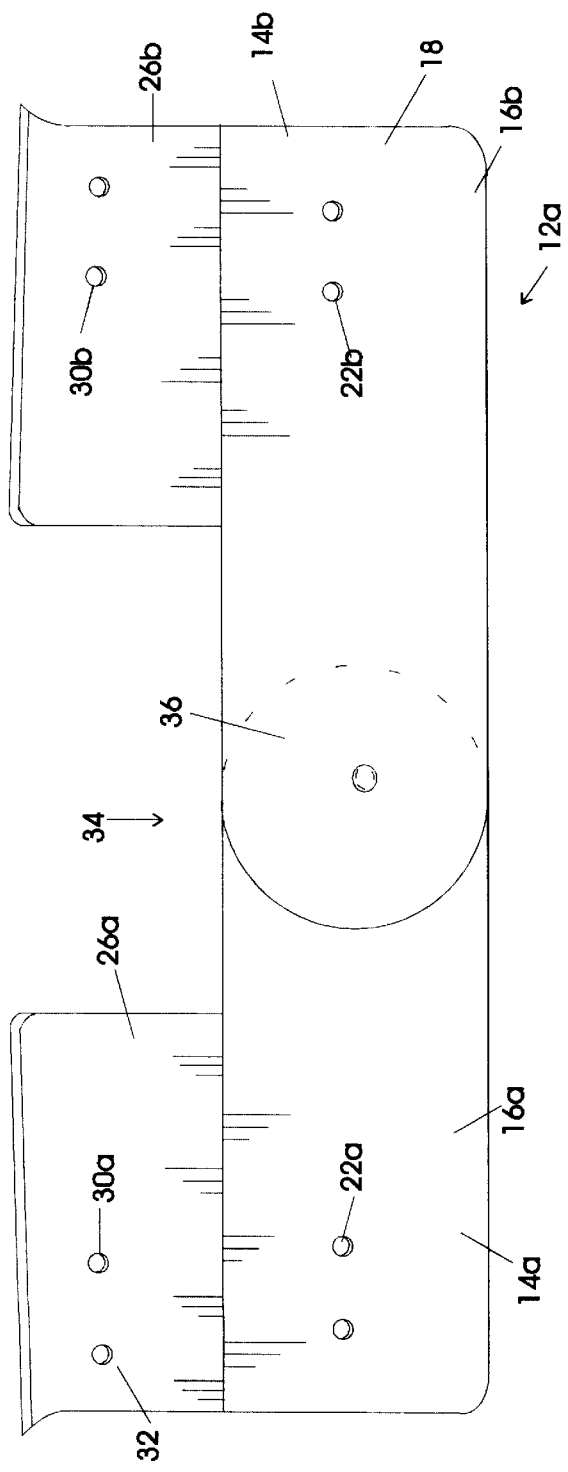
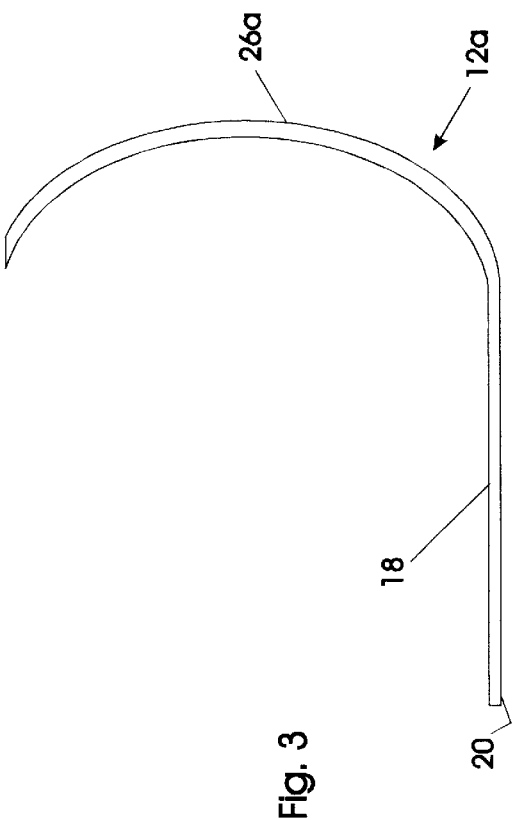
Fig. 2
Fig. 3

MODULAR LANDSCAPE APPARATUS AND METHOD THEREOF

This is a Continuation-in-Part of application Ser. No. 09/069,336 filed Apr. 28, 1998 which has been abandoned.

BACKGROUND OF THE INVENTION

1. Field of the Invention

The present invention relates generally to a modular landscape apparatus and more particularly to a modular landscape apparatus comprising a plurality of brackets for receiving landscape timbers or logs, the brackets are modules designed and configured to abut each other and can be stackable to allow the user to form and shape a desired boundary to any desired height for flower beds, landscapes, and the like.

2. Description of the Prior Art

In recent years, landscaping has become one of the fastest growing and most enjoyable hobbies due to the gratification and stress release one receives after working in their yard. A well-groomed yard is not only aesthetically pleasing, but is also known to inherently increase the property value of one's home.

One important aspect in landscaping is to determine the boundaries of a particular area, generally using an edging border for defining flower beds, walkways, or the like. Typically, these borders are modular structures which come in a variety of forms and can be fabricated from a multiplicity of material, such as cement, plastic, wood, metal or the like.

Conventional landscaping timber is one known border which is commonly used and widely available. These timbers and sold in nurseries, garden centers, and various other stores having garden departments. The timbers are generally elongated logs having one flat lower surface which will be placed on the soil. They can further be secured with pins or the like. Though aesthetically pleasing and very desirable by the home gardener, these logs, in time, will rot or possibly dislodge from its original location since they are in constant contact with nature and its various elements, particularly moisture, such as rain and snow, which will inherently promote the deterioration of wood.

Another border system is disclosed in U.S. Pat. No. 5,675,930 issued to Cooper. In this patent there is disclosed an apparatus used for defining landscape boundaries. This system includes a plurality of longitudinal logs having spaced apart ends, one of which is pronged and the other is flanged. The pronged and flanged ends are designed so as to engage one another by virtue of a pivot pin. Using a pivot pin provides a structure which can be arranged in a variety of curved configurations, if necessary. This system, as define above may be ideal for providing edging around an awkward shaped bed, but this edging does suffer some shortcomings. One obvious drawback is that the system fails to have an adequate means of securing the elongated logs to the ground. One torrential rainstorm or even an impact with a lawn mower could easily dislodge the logs. Further, the combination of the flange end and prong end being secured via a pivotal arrangement provides for the flange end to protrude. This protrusion can be obtrusive, both visually and physically, something undesirable by a homeowner.

Yet another system is disclosed in U.S. Pat. No. 5,442,877 issued to Lindhal. In this patent there is disclosed a system having a plurality of generally V-shaped edging modules and a plurality of curved modules connectable to one another via a plurality of connecting modules. The combination of the various modules provides an overall system with a plurality of elements. The additional elements will inherently add to the time and effort needed to install the system, thereby providing an edging assembly that is cumbersome to position to the ground.

Still another landscaping device is disclosed in U.S. Pat. No. 4,905,409 issued to Cole. In this patent there is disclosed a landscape timber border comprising a plurality of units which are interlocked and secured together to form various regular and irregular formations. The unit includes two identical timber members which are fastened together in an overlapping, but longitudinally offset relationship. This system may be aesthetically pleasing, but like the previous systems, does suffer some shortcomings. One is that the wood is stacked one on top of each other. This arrangement does not allow a gap to exist between the two layers. Hence, should the wood get wet, it will not dry adequately and the decaying process is accelerated. In addition, the design and configuration provides for the wood to contact the ground, another feature which will accelerate this decaying process. This accelerated decaying process will provide a product which is not aesthetically pleasing, thereby, defeating the purpose of the border.

Accordingly, it is seen that none of these previous efforts provide the benefits intended with the present invention, such as providing a long lasting, durable and aesthetically pleasing product. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a modular landscape apparatus that is used in combination with conventional landscape timbers. Using the present invention will provide a means for quickly and efficiently installing landscape timbers. This bracket will drastically reduce the time generally associated with the installation of conventional landscape timbers. In order to enable such an arrangement, the present invention comprises a plurality of brackets, wherein each bracket includes a substantially L-shape configuration.

Each bracket includes a flat planar wall and a sidewall secured thereto, for inherently forming a substantially L-shape configuration. The flat planar wall includes an interior surface and an exterior surface. The interior surface is designed and configured to receive the conventional landscape timber. This flat planar wall includes at least one aperture which is a receiving device for receiving a securing device. The securing device can be a conventional pin for securing the flat planar wall to the ground or optionally, can be a screw, nail or the like for securing and stacking an additional bracket to the top of a conventional landscape timber. In this arrangement, the exterior surface will contact the ground or will contact a lower conventional landscape timber when in a stacked position.

Extending substantially perpendicularly from an outer edge of the flat planar wall is the sidewall. The sidewall is configured to be slightly contoured and curved so as to allow for water to be dispersed away from the brackets to inherently increase the life span of the conventional landscaped timbers. In addition, the slight contours of the side will enable the bracket to conform to the conventional timber, since they come in a variety of heights. It is also noted that this wall may partially extend the length of the flat planar wall.

This sidewall will also engage a sidewall of the conventional timber, aiding in maintaining it in a fixed and secured position. Extending through each sidewall is at least one aperture. This aperture acts as a receiving device and receives and maintains a securing device. The securing device can be nails or the like, for adding to the securment of the timber to the bracket.

The present invention includes two embodiments. In the first embodiment, the bracket will be of a single entity and many of these singular units will be used when defining a landscape area. In the first embodiment, the bracket will include a first portion pivotally secured to a second portion. Each portion will receive a single landscape timber. This pivotal attachment will allow for the bracket to bend to any angle and thus allow for the timbers to be placed at any angular attachment, for inherently providing for any shape or style edge.

In the second embodiment, a plurality of brackets are included. The brackets do not include the pivot attachment and thus will include different configurations for allowing the user to form the edge into any shape or design. Hence, the bracket can comprised of at least one section, each section including a planar wall and a sidewall. For a different configuration, for an integral bracket, the bracket can have at least two sections. The sections are coupled to each other at any desired angle to provide for the integral planar wall of each bracket having at least two sections to have a substantially L-shape or even a V-shape configuration. This will offer more versatility to the user with only the user's imagination being his limitation.

Accordingly, it is the object of the present invention to provide for a modular landscape apparatus which will overcome the deficiencies, shortcomings, and drawbacks of prior modular landscape apparatus and methods thereof.

Another object of the present invention is to provide a modular landscape apparatus which will prolong the life of conventional landscape timber.

Yet another object of the present invention is to provide a modular landscape apparatus which can be stackable as well as alignable.

Still another object of the present invention is to provide a modular landscape apparatus which is affixed to the ground in a secured position.

Still another object of the present invention, to be specifically enumerated herein, is to provide a modular landscape apparatus in accordance with the preceding objects and which will conform to conventional forms of manufacture, be of simple construction and easy to use so as to provide a device that would be economically feasible, long lasting and relatively trouble free in operation.

Although there have been many inventions related to a modular landscape apparatus, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

FIG. 2 is a front planar view of the first embodiment of the modular landscape apparatus of the present invention.

FIG. 3 is a side view of the first embodiment of the modular landscape apparatus of the present invention.

Similar reference numerals refer to similar parts throughout the several views of the drawings.

DESCRIPTION OF THE PREFERRED EMBODIMENTS

Figure 1:
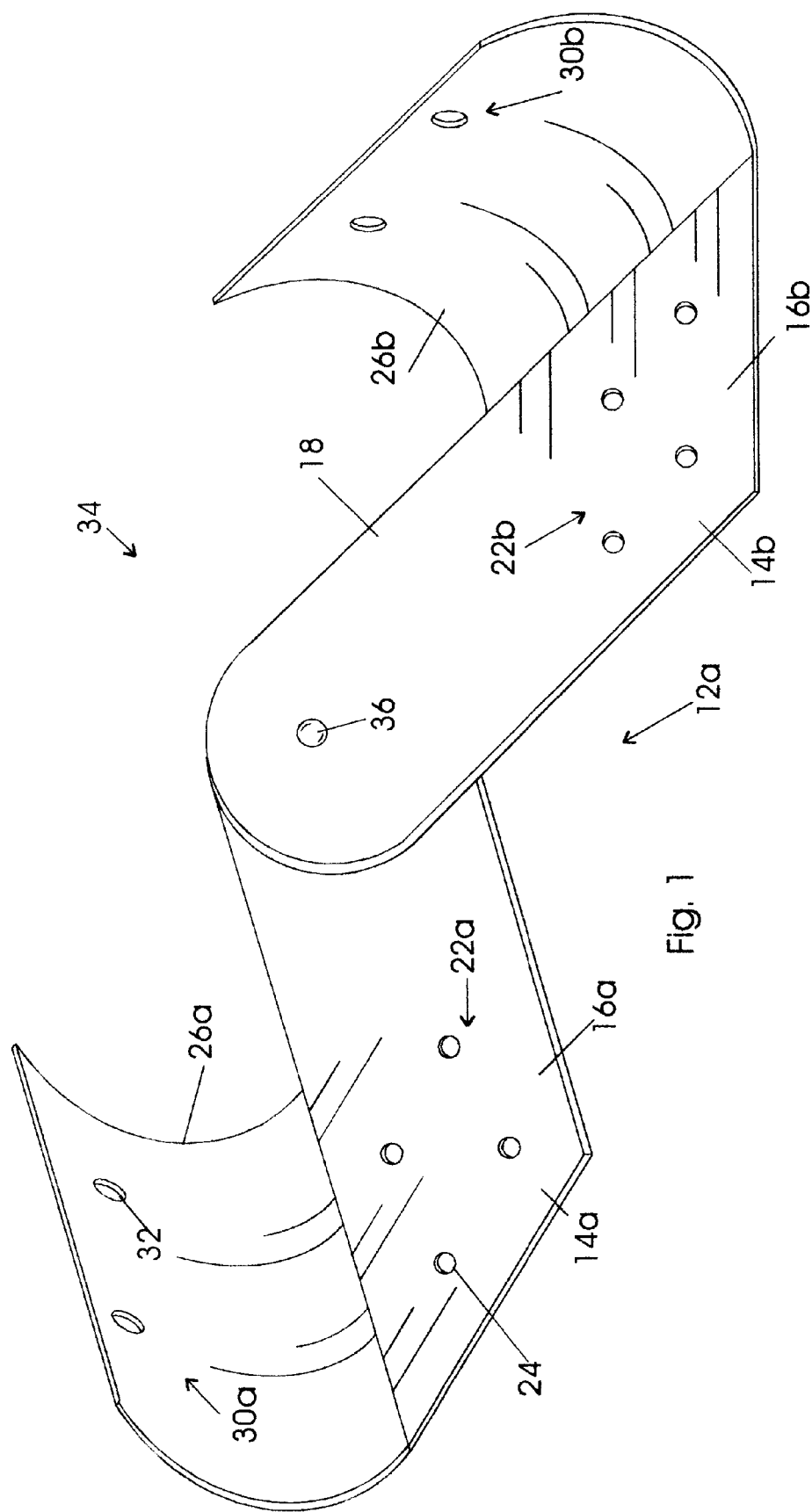
FIG. 1 is a perspective view of the first embodiment of the modular landscape apparatus in a bent position.

With reference to drawings and in particular to FIGS. 1–4 thereof, the modular landscape apparatus of the present invention will be described. The present invention is a modular landscape apparatus 10 which is designed and configured, or as seen in FIGS. 1a, 1b and 2, to be used in combination with conventional landscape timbers T. Optionally, as seen in FIGS. 1b and 2, the modular landscape apparatus 10 can be stacked so as to form any shape or height border.

Figure 4:
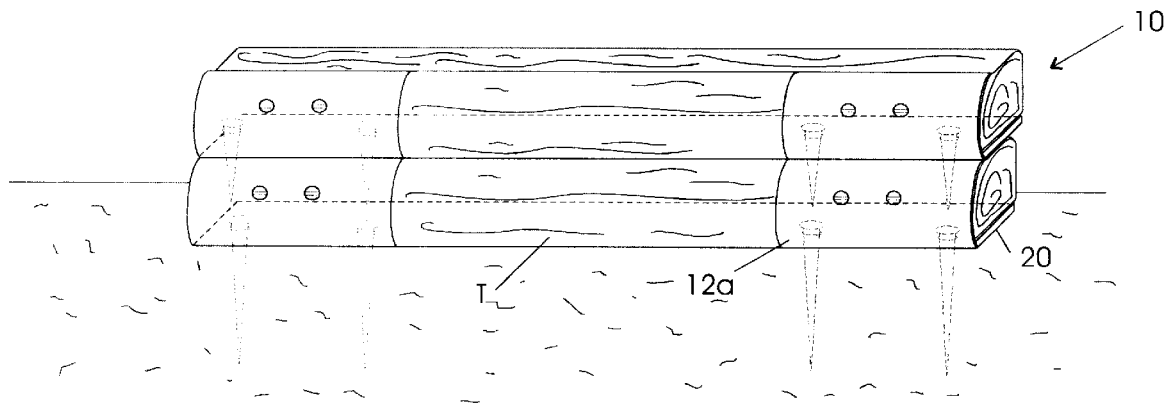
FIG. 4 is an enlarged perspective view of a pair of stacked brackets, such as the ones used in the modular landscape apparatus illustrated in FIG. 1.

The modular landscape apparatus 10 is a versatile unit that enables the apparatus to be visual, as seen in FIG. 4, or optionally, allows for the landscape timbers T to be visual, as is preferred. The modular landscape apparatus is basically a plurality of brackets. Using brackets will provide for the process of installing conventional landscape timbers to occur quickly and efficiently. Using the brackets will also enable the user to stack timbers, and enable the stacking process to occur quickly.

For obtaining any desired landscape configuration, a pivotal bracket can be utilized. This pivotal bracket is illustrated in FIGS. 1–4 and is denoted by reference numeral 12a. As seen in this figure, the bracket 12a includes a first portion 14a is pivotally secured to a second portion 14b.

As seen in FIGS. 1, 2 and 4, each portion or section, 14a and 14b, includes a flat planar wall 16a and 16b, respectively, having an interior surface 18 and an exterior surface 20 (illustrated in FIG. 4). Extending upwardly from an edge of each wall is an upward sidewall 26a and 26b, respectively. As seen, the sidewall 26a and 26b partially expands the length of the flat planar wall. Each section will receive a log or an individual landscape timber T, as seen in FIG. 4. Accordingly, in this embodiment, either a first timber will be secured to the first section 14a and a second timber will be secured to the second section 14b or optionally, a singular timber will be located on this bracket.

In this embodiment, each planar wall 16a and 16b further includes a securing device 22a and 22b for enabling each section to be secured to the desired structure, such as the ground or a lower timber. The securing device 22a and 22b can be any conventional securing device, but as illustrated, and which has produced favorable results, the securing device includes at least one aperture 24 which is a receiving device for receiving an engaging member, such as a pin, screw, or the like. For added security and in the preferred embodiment as illustrated in FIGS. 1, 2 and 4, the securing device can include paired apertures located in proximity to the ends of the bracket. Hence, as seen, a first set of apertures will be located at the outer end of the first section 14a while the second set apertures will be located at the outer end of the second section 14b.

Extending substantially perpendicularly from an outer edge of each flat planar wall 16a and 16b is the sidewall 26a and 26b. The sidewall, as seen in FIGS. 1 and 3 is curved. This wall is also fabricated from a flexible, yet sturdy material. The use of a curved wall and one which is flexible, will allow for the sidewall to conform to the side of a conventional timber. Since timbers are not all of the same size and shape, this flexible curved sidewall will innately conform and fit on the side of the conventional timber. It is noted that the sidewall of each section does not extend the entire length of the flat planar wall 16a or 16b. This will inherently provides for a gap 34 to be located between the two sidewalls.

To aid in securing the timber T to each section of the bracket, a fastening device 30a and 30b is utilized. This fastening device 30a and 30b is similar to the securing device 22a and 22b of the flat planar wall 16a and 16b. As such, this fastening device includes at least one aperture 32. This aperture will receive a conventional implement, such as a screw, nail, or the like, for affixing each timber T to its respective section on the bracket 12b.

Centrally located on flat planar wall, between each section is a convention swivel member 36. This swivel member 36 is a conventional swivel and is designed and configured to allow for the first portion and second portion to pivot around the swivel. This pivoting will allow for the consumer to obtain the desired angle for attaching the landscape timber to the bracket. Ultimately providing for an aesthetically pleasing landscaped area. The gap 34 enables the bracket the clearance needed in order to obtain any desired angle.

The option of having a bracket that swivels provides for a final product that is user friendly by providing a device with a plurality of options and versatility.

Using the present invention will enable a consumer to quickly and efficiently from and define landscape beds. To use the present invention, the consumer defines and marks the boundary area. Once marked the brackets are secured to the defined boundary via the securing device. One would insert a pin, such as the one illustrated in FIG. 4, through an aperture 24 and into the ground. This will secure the bracket to the ground. Once the brackets are in placed, the timbers are secured to the bracket. The timbers are secured via the fastening device 30a or 30b. In this arrangement, the user inserts a screw, or the like into the aperture 32 located within the sidewall. This will secure the timber to the bracket. If a higher height is desired, then a second or additional layer is used. For using a second layer, as seen in FIG. 4, brackets are secured to the lower timber via the securing device. In this arrangement, the brackets are placed on top of the lower timber, and screws or the like are inserted into the aperture 24 for securing the bracket to the lower timber. The timber is secured to the bracket as defined above. This method will allow for a more secure method of attaching the timbers to the desired location.

Figure 5:
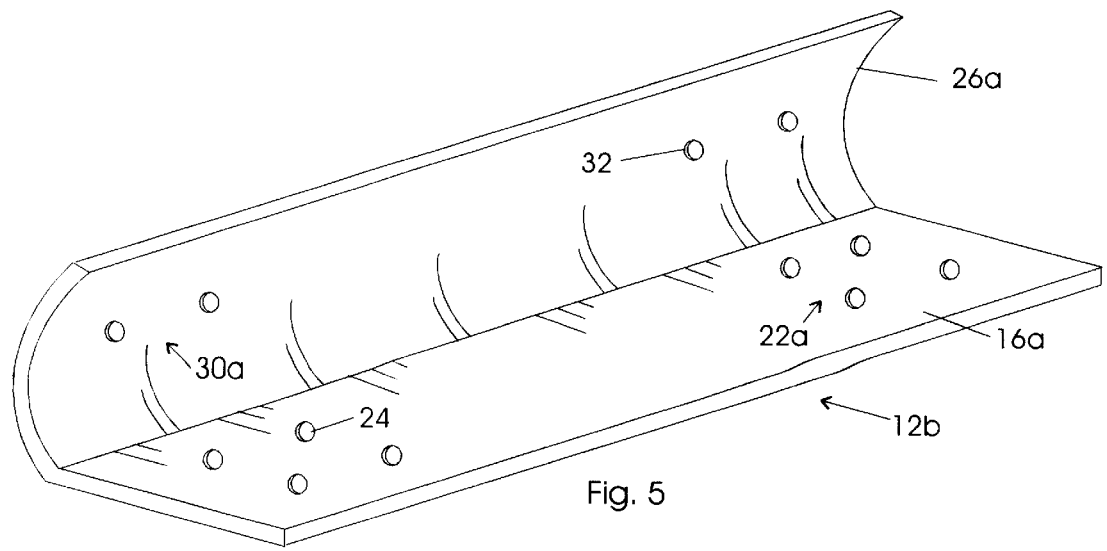
FIG. 5 is a perspective view of a bracket used in the second embodiment of the modular landscape apparatus of the present invention.
Figure 6:
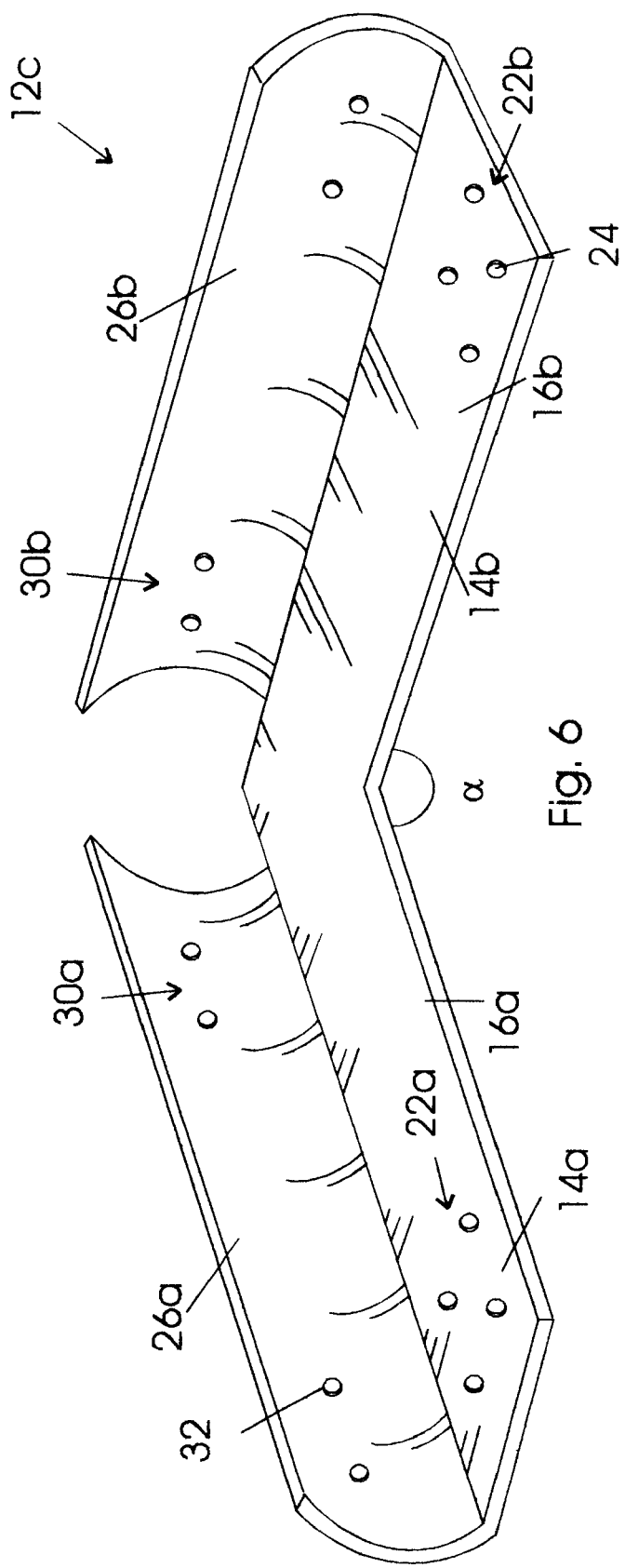
FIG. 6 is a perspective view of an alternative bracket having an inward elbow configuration and which is used in the second embodiment of the modular landscape apparatus of the present invention.
Figure 7:
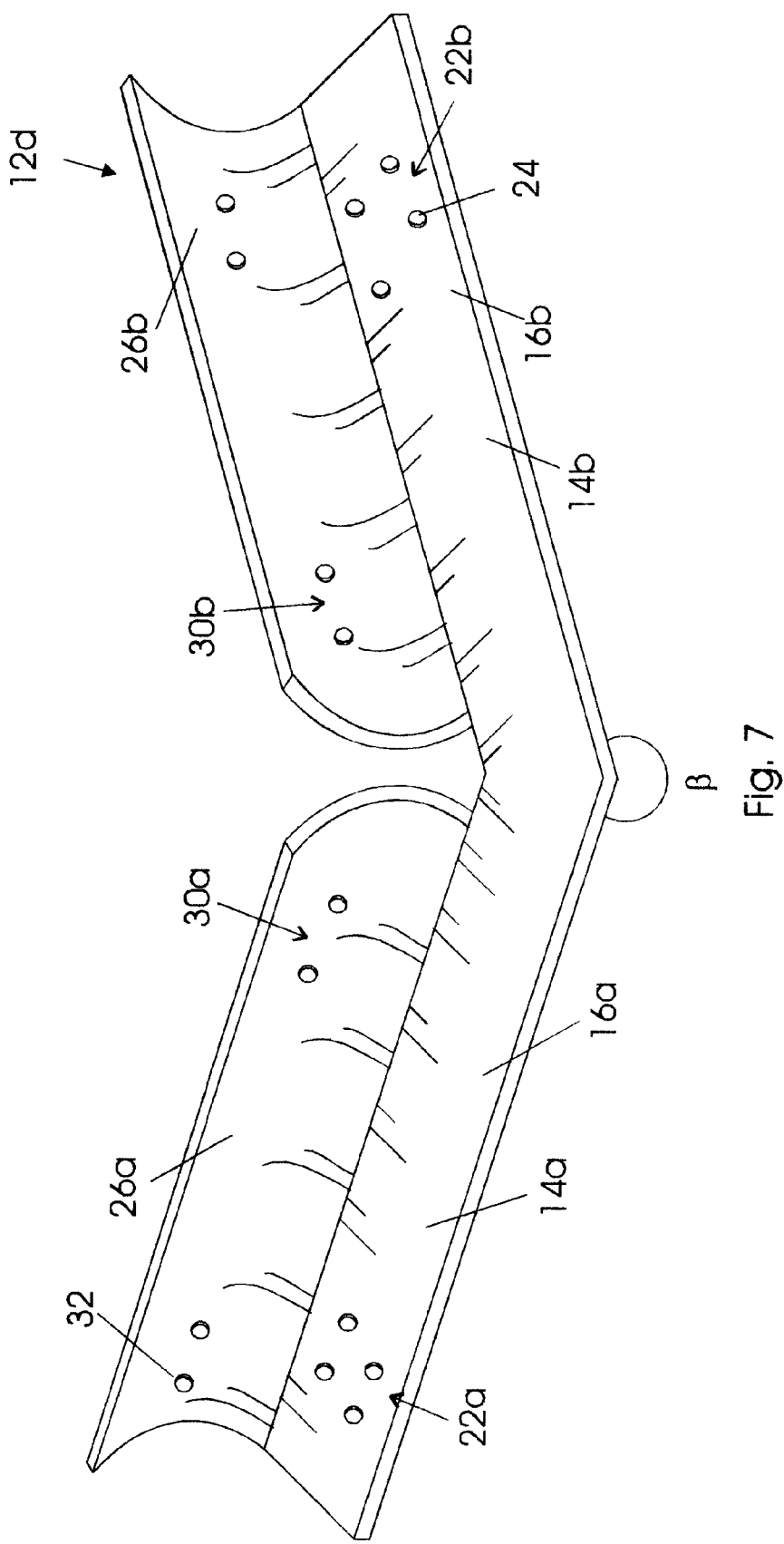
FIG. 7 is a perspective view of an alternative bracket having an outward elbow configuration and which is used in the second embodiment of the modular landscape apparatus of the present invention.

Optionally, the swivel can be eliminated and a plurality of brackets can be used for the modular landscape apparatus of the present invention. These brackets provide for a second embodiment. This second embodiment of the modular landscape apparatus 10 provides for each bracket to be integral in structure and formed so as to cup and maintain the conventional landscaping timber T. A first bracket of second embodiment of the present invention is labeled as 12b and is illustrated in FIG. 5. A second bracket of the second embodiment is labeled as 12c and is illustrated in FIGS. 6. A third bracket of the second embodiment of the present invention is labeled as 12d and is illustrated in FIG. 7.

As seen in the various figures, the brackets do include a plurality of configurations, substantially similar in shape, to provide for each bracket to include at least one section. Each section includes a flat planar wall, having an interior surface 18 and an exterior surface, and an upward wall 26a or 26b. When used with a landscaping timber T, this interior surface 18 will contact and engage the log.

The first bracket is illustrated in further detail in FIG. 5. As seen in this figure, the first bracket 12b includes one section 14a having a flat planar wall 16a and sidewall 26a.

Extending through the planar wall 16a is a securing device 22a. This securing device 22a enables the bracket to be secured to a desired surface, such as the ground or optionally, in the stackable arrangement, to a top surface of a lower timber, as illustrated in FIG. 4. The securing device 22a can be any conventional securing device, one which is illustrated and has produced favorable results is a securing device comprising at least one aperture 24 and at least one engaging device. The apertures form a receiving device for receiving the engaging device, such as a pin, screw, or the like. For added security, and in the preferred embodiment as illustrated in FIG. 5, the securing device can include two pair of apertures located in proximity to the end of the bracket.

This securing device is clearly illustrated in FIG. 4, wherein there is shown a lower bracket having pins extending into the ground. These pins will secure the lower bracket to the ground. A second or top bracket is secured to the lower timber via screws (illustrated but not labeled). This arrangement will provide for the screws to secure the second bracket to the lower timber. Thereby, providing a final system that can be stackable.

In this arrangement, the exterior surface will contact the ground or will contact a lower conventional landscape timber when in a stacked position. In addition, this will allow for either the timber to be visual or for the bracket to be visual, as desired by the user.

As seen in FIG. 5, extending substantially perpendicularly from an outer edge of the flat planar wall 16a is the sidewall 26a. The sidewall 26a is curved. This shape will provide to the upper end of bracket to act as a deflector for allowing water to be dispersed away from the brackets. This displacement of water will inherently increase the life span of the conventional landscaped timbers.

When the timber T is secured to the bracket 12a, the sidewall 26a will consequently be facing and partially contacting the sidewall of the conventional landscaping timber T. To aid in securing the timber T to the bracket, a fastening device 30a is utilized. This fastening device 30a is similar to the securing device 22a of the flat planar wall 16a or 16b. As such, this fastening device includes at least one aperture 32 and an engaging device. This aperture will receive the engaging device, which can be any conventional implement, such as a screw, nail, or the like, for affixing the timber T to the bracket 12a.

The brackets are not limited to only one section 14a as seen in FIG. 5 but can include a plurality of sections. These additional sections will provide for additional brackets, such as the embodiment illustrated in FIG. 6.

As seen in this figure, the bracket 12c includes a first portion 14a coupled angularly to a second portion 14b. Each section includes a flat planar wall 16a and 16b, respectively, having an interior surface 18, an exterior surface, and an upward wall 26a and 26b, respectively. Each section will receive a log or an individual landscape timber T. Accordingly, in this embodiment, a first timber will be secured to the first section 14a and a second timber will be secured to the second section 14b.

In this embodiment, each planar wall 16a and 16b further includes a securing device 22a and 22b for enabling each section to be secured to the desired structure, such as the ground or a lower timber. The securing device 22a and 22b can be any conventional securing device, but as illustrated, and which has produced favorable results, the securing device includes at least one aperture 24 which is a receiving device for receiving an engaging member, such as a pin, screw, or the like. For added security, and in the preferred embodiment as illustrated in FIG. 6, the securing device can include paired apertures located in proximity to the ends of the integral bracket. Hence, as seen in this figure, a first set of apertures will be located at the outer end of the first section 14a while the second set apertures will be located at the outer end of the second section 14b.

Extending substantially perpendicularly from an outer edge of each flat planar wall 16a and 16b is the sidewall 26a and 26b. The sidewall 26a and 26b is curved.

To aid in securing the timber T to each section of the bracket, a fastening device 30a and 30b is utilized. This fastening device 30a and 30b is similar to the securing device 22a and 22b of the flat planar wall 16a and 16b. As such, this fastening device includes at least one aperture 32. This aperture will receive a conventional implement, such as a screw, nail, or the like, for affixing each timber T to its respective section on the bracket 12c.

As seen in this figure, each section is substantially identical and offers the same benefits as the bracket disclosed in FIG. 5. The use of more than one section allow for the sections to be secured to each other angularly. This offers more options and versatility to the user and the landscaper. In this figure, the angle is inward and is ideal when the bracket is to be shown in the garden design. This will provide for the connection between the planar walls 16a and 16b to be disposed at an acute angle or can even be a right angle. This is illustrated via reference angle $\alpha$.

It is noted that this angular connection between the first and second portions can occur at any angle to achieve any desired appearance or shaped elbow.

When it is advantageous to include a post within the boundary line or any vertical member, a portion of the sidewall can be flat for receiving the particular post. Hence eliminating the contoured section. This one vertical portion can receive vertical posts or the like. A securing device such as the ones discussed and illustrated throughout the figures can be located on this vertical portion. This securing device will allow for the vertical structure to be secured thereto. One example of a securing device can be apertures extending through the vertical portion and screws being adapted to be inserted into the apertures and into the structure.

Optionally, when it is desirable to have the landscape timbers to be shown in the landscape designed, an alternative embodiment for the bracket is shown in FIG. 7. This figure illustrates the angle extending outward, producing a different angularly disposed bracket.

Hence, as seen, each bracket includes substantially the same components as illustrated in FIG. 6, except that the sections extend outward instead of inward. This will provide for the connection between the planar walls 16a and 16b to be disposed at an obtuse angle or optionally at a right angle. This is illustrated via reference angle $\beta$. Accordingly, the outward extending brackets includes a flat planar wall 16a and 16b, respectively, having an interior surface 18 and an exterior surface 20, and an upward wall 26a and 26b, respectively. Each planar wall 16a and 16b further includes a securing device 22a and 22b for enabling each section to be secured to the desired structure, such as the ground or a lower timber.

Extending substantially perpendicularly from an outer edge of each flat planar wall 16a and 16b is the sidewall 26a and 26b. Each sidewall 26a and 26b is curved. Each sidewall includes a fastening device 30a and 30b.

Optionally, the brackets illustrated in FIGS. 1–7 can further include a vertical or straight portion.

For that reason, it is seen that the present invention is a modular landscape apparatus including a plurality of brackets. The brackets are used in combination with logs, landscape timbers or the like. The use of combining the bracket with a log, timber or the like, will add more versatility to the overall appearance, as well as add structural strength to the final product.

The unique construction of each bracket provides a final product that will enable the log or the bracket to be viewed. In addition the different angular configuration, alternating, either increasing or decreasing angles $\alpha$ and $\beta$, will allow the user to form the edge into any shape or design. Further, the universal shape of each enables the user to stack the brackets and timber to achieve any desired height. Thereby providing only the user's imagination being his limitation. Thus, the singular section bracket, illustrated in FIG. 5, can be considered an elongated bracket while the dual section brackets are considered elbow brackets.

The brackets shown can be fabricated from any durable material, such as, but not limited to metal, plastic, plastic coated metal, or the like.

While the invention has been particularly shown and described with reference to an embodiment thereof, it will be understood by those skilled in the art that various changes in form and detail may be made without departing from the spirit and scope of the invention.

What is claimed is:

1. A modular landscape apparatus comprising:
    at least one bracket;
        said at least one bracket includes a first portion and a second portion;
    a pivot attachment secures said first portion to said second portion and provides for said first portion and said second portion to form a singular unit and said pivotal attachment is permanently secured thereto;

said pivot attachment enables said first and second portion to pivot freely about said pivot attachment;

each portion includes a flat planar wall and sidewall perpendicularly attached to said flat planar wall;

outer ends of said flat planar wall and said sidewall of said bracket are aligned;

a first securing device is located on said flat planar wall for securing said elongated bracket to a desired surface and said first securing device is a separate entity from said pivotal attachment;

said side wall is fabricated from a flexible and sturdy material and said side wall is curved; and a second securing device is located on each second flat planar wall for securing said elongated bracket to a desired surface and said second securing device is a separate entity from said pivotal attachment.

2. A modular landscape apparatus as in claim 1 wherein said bracket is fabricated from metal.

3. A modular landscape apparatus as in claim 1 wherein said first securing device is at least one aperture adapted to removably receive a securing implement.

4. A modular landscape apparatus as in claim 3 wherein said securing implement is a stake or a screw.

5. A modular landscape apparatus as in claim 1 wherein said second securing device is at least one aperture adapted to removably receive a securing implement.

6. A modular landscape apparatus as in claim 5 wherein said securing implement is a screw.

7. A modular landscape apparatus as in claim 1 wherein each sidewall partially extends a length of said flat planar wall.

8. A modular landscape apparatus as in claim 1 wherein said flat planar wall of said first portion is pivotally secured to said flat planar wall of said second portion.

9. A modular landscape apparatus as in claim 8 wherein said sidewall of said first portion partially extends a length of said flat planar wall of said first portion.

10. A modular landscape apparatus as in claim 9 wherein said sidewall of said second portion partially extends a length of said flat planar wall of said second portion.

11. A modular landscape apparatus as in claim 8 wherein a gap is located between said first sidewall of said first portion and said second sidewall of said second portion.

12. A modular landscape apparatus as in claim 11 wherein each of said bracket is fabricated from metal.

13. A modular landscape apparatus as in claim 1 having at least two brackets and at least a second bracket including a singular portion and each portion of said second bracket includes a flat planar wall and a curved sidewall perpendicularly attached to said flat planar wall of said second bracket, a securing device is located on said flat planar wall of said second bracket.

14. A modular landscape apparatus as in claim 1 wherein a fastening device is located on each side wall of said first portion and said second portion for enabling items to be secured to said first portion and said second portion.

* * * * *